United States Patent Office 2,909,490
Patented Oct. 20, 1959

2,909,490

MANUFACTURE OF DUPLEX COMPOSITION OF SODIUM TRIPOLYPHOSPHATE AND SODIUM SILICATE SOLUTION

Max Metziger, Joliet, Ill., assignor, by mesne assignments, to Olin Mathieson Chemical Corporation, New York, N.Y., a corporation of Virginia No Drawing. Application July 28, 1954
Serial No. 446,399

5 Claims. (Cl. 252—135)

The present invention relates to solid compositions combining one or more forms of sodium tripolyphosphate (hereinafter sometimes referred to as STPP) and the contents of normally aqueous liquid forms of sodium silicate.

Various uses of aqueous liquid forms of certain sodium silicates, as well as various uses of dry solid forms of some sodium silicates, involve compounding such materials with one or more ingredients including particularly sodium tripolyphosphate. In alkaline detergents, sodium silicate having a low ratio of sodium oxide to silicon dioxide is effective as an anti-corrosion agent for many metals. Numerous manufacturers compound solid mixtures including sodium tripolyphosphate and a form of sodium silicate. Such manufacturers prefer all the ingredients of the composition to be solid, and for that reason the dry forms of sodium silicate are frequently selected. Such selected dry forms may be less suitable for certain functions because of a less favorable ratio of $Na_2O$ to $SiO_2$, than aqueous liquid forms having a more suitable ratio. Sodium silicates of certain ratios are available in both dry form and aqueous liquid form, the latter being less costly, but the former being preferred in order to avoid the inconvenience or difficulty of mixing the liquid form with dry solid ingredients. An important objection to use of some dry solid sodium silicates is their slowness to dissolve in water compared to the same solid content in aqueous solution.

Some sodium silicates having certain desirable ratios are available only in aqueous liquid forms and are not capable of dehydration to solid dry forms. The present invention permits certain aqueous liquid forms to be used as a solid when accompanied in the ultimate composition by sodium tripolyphosphate.

It is the general object of the present invention to provide a fast-dissolving sodium silicate in solid form as a component of a duplex composition of sodium silicate and sodium tripolyphosphate.

It is also an object of the present invention to provide dry solid compositions consisting analytically of anhydrous sodium tripolyphosphate, anhydrous sodium silicate having a limited range of ratio of $Na_2O$ to $SiO_2$, and water.

It is a particular object of the invention to convert certain aqueous liquid sodium silicates to a dry solid duplex composition combining it with sodium tripolyphosphate.

It is also an object of the invention to provide a dry solid granular composition combining sodium tripolyphosphate and certain aqueous liquid forms of sodium silicate with or without additional water.

Various other and ancillary objects and advantages of the invention will become apparent from the following descriptions and explanation.

Sodium tripolyphosphate is available in anhydrous form. It readily hydrates to stable crystals of the formula $Na_5P_3O_{10} \cdot 6H_2O$. When the resulting crystals are dissolved in water at a temperature upwardly from 60° C., the tripolyphosphate decomposes by reversion to orthophosphate. The present invention is based upon the discovery that by mere physical contact at temperatures below said decomposition temperature, anhydrous sodium tripolyphosphate effectively dehydrates aqueous liquid forms of certain sodium silicates, and by selection of the sodium silicate solution and the proportions of it to be combined with anhydrous sodium tripolyphosphate, a dry granular duplex composition may be formed. By other selections, solid duplex compositions may be formed which exhibit a degree of stickiness, making the sticky product unsatisfactory as an ingredient for compounding with other dry solid ingredients.

In general, it has been found that the higher the ratio of $Na_2O$ to $SiO_2$ in the sodium silicate, the more the duplex composition tends to be sticky, and the proportion of the sodium silicate that can be used in the compound is lowered.

One may readily theorize that the anhydrous sodium tripolyphosphate is capable of abstracting all the water from a liquid sodium silicate, forming $Na_5P_3O_{10} \cdot 6H_2O$. Such a theory suggests that where the anhydrous sodium tripolyphosphate is in excess of the amount of water available for it to form hydrated crystals, one would procure an anhydrous sodium silicate, thus explaining the production of a dry granular duplex composition. Also, such theory suggests that the sticky duplex compositions result from use of an insufficient amount of anhydrous sodium tripolyphosphate for the water in or present with the selected liquid sodium silicate, whereby only a partially dehydrated liquid sodium silicate remains.

However, numerous studies indicate that the theoretical considerations above suggested do not conform to the facts. Dry compositions have resulted where there is present initially more water, partly as such or wholly as content of a liquid sodium silicate, than is needed to hydrate all of the anhydrous sodium tripolyphosphate. Under the same conditions, sticky compositions have been produced. In other instances where there has been used an insufficient amount of total water to hydrate all of the anhydrous sodium tripolyphosphate, both sticky and dry granular compositions have been obtained. When dry granular products of the present invention are dissolved in water, they dissolve readily, and not with the order of slowness characteristic of anhydrous sodium silicates.

From the foregoing facts, it appears that as between anhydrous sodium tripolyphosphate and the anhydrous content of any particular sodium silicate liquid, there is competition for water resulting in an equilibrium distribution of the water forming a residual hydrated sodium silicate which may be dry or sticky, depending on the ratio of $Na_2O$ to $SiO_2$ and on the water equilibrium. Variation of the mixing temperature below the decomposition temperature of the hydrated sodium tripolyphosphate crystals appears to have little effect upon the dry or sticky nature of the product.

Among the aqueous liquid sodium silicates available in commerce, the following have been employed in developing the present invention and are referred to herein by the symbols indicated in Table I.

Table I

| Symbol[1] | Ratio, $Na_2O$ to $SiO_2$ | Weight Percent | | |
|---|---|---|---|---|
| | | $Na_2O$ | $SiO_2$ | $H_2O$ |
| N | 1 to 3.22 | 8.9 | 28.7 | 62.4 |
| RU | 1 to 2.40 | 13.8 | 33.1 | 53.0 |
| D | 1 to 2.00 | 14.5 | 29.0 | 56.4 |
| BW | 1 to 1.60 | 19.5 | 31.2 | 49.1 |

[1] The above "symbols" are also registered trademarks of Philadelphia Quartz Company, Philadelphia, Pennsylvania.

In carrying out certain studies reported below to illustrate the invention, a mechanical mixer is employed in which a mass of anhydrous particles of sodium tripolyphosphate is churned. Into this mass is dripped or run slowly for thorough distribution a liquid form of the sodium silicate as given in Table I, or such liquid diluted with a known amount of water to facilitate its flow and its mixing with the sodium tripolyphosphate. The addition is stopped and the mixing thereafter continued to insure homogeneity of distribution and of product. When a dry form of duplex composition is achieved in one hour, the product is in the preferred class. When a sticky form is produced and persists during mixing to homogeneity for a period of time from one to six hours, it is considered to be outside of the invention. In practice, the procedure may be empirically established as to quantities and kinds of material and as to times of addition and mixing, so as to assure a dry product by a standard procedure.

In Table II below, there are given the quantities of materials used and the character of the product, as either dry or sticky, obtained in six hours or less.

By converting the parts by weight to moles, and applying the theory that all the water present is used to hydrate the anhydrous sodium tripolyphosphate, more significant facts are apparent, as set forth in Table III.

Table II
[Parts by weight.]

| Example[1] | Anhydrous STPP | Sodium Silicate | Water | Product |
|---|---|---|---|---|
| N-1 | 600 | 400 | | Dry. |
| N-2 | 620 | 354 | 26 | Dry. |
| N-3 | 674 | 239 | 87 | Dry. |
| N-4 | 450 | 550 | | Sticky. |
| N-5 | 500 | 452 | 48 | Sticky. |
| N-6 | 600 | 292 | 108 | Sticky. |
| N-7 | 680 | 146 | 174 | Sticky. |
| RU-1 | 796 | 204 | | Dry. |
| RU-2 | 859 | 45 | 96 | Dry. |
| RU-3 | 810 | 9 | 181 | Dry. |
| RU-4 | 550 | 450 | | Sticky. |
| RU-5 | 700 | 160 | 140 | Sticky. |
| D-1 | 859 | 69 | 72 | Sticky. |
| BW-1 | 869 | 79 | 52 | Sticky. |
| BW-2 | 805 | 10 | 185 | Sticky. |

[1] Letter designates silicate solution of Table I.

In Table III, the columns are numbered and are as follows:

Column:
1—The example set out in Table II.
2—Moles of anhydrous $Na_5P_3O_{10}$.
3—Moles $Na_2O$ in sodium silicate.
4—Moles $SiO_2$ in sodium silicate.
5—Moles of water in sodium silicate plus moles of added water.
6—Theoretically possible moles of $Na_5P_3O_{10} \cdot 6H_2O$.
7—Theoretical moles of residual water.
8—Theoretical moles unhydrated $Na_5P_3O_{10}$.
9—Theoretical: molar percent $H_2O$ in residual partially dehydrated sodium silicate solution.
10—Character of product.

Table III
[In moles.]

| 1 | 2 | 3 | 4 | 5 | 6 | 7 | 8 | 9 | 10 |
|---|---|---|---|---|---|---|---|---|---|
| | | | | | | Residual | | Molar Percent $H_2O$ | |
| Exam. | STPP | $Na_2O$ | $SiO_2$ | $H_2O$ | STPP $6H_2O$ | $H_2O$ | STPP | | Product |
| N-1 | 1.63 | .575 | 1.85 | 13.9 | 1.63 | 4.1 | 0 | 63 | Dry. |
| N-2 | 1.685 | .508 | 1.635 | 13.74 | 1.685 | 3.64 | 0 | 63 | Dry. |
| N-3 | 1.83 | .344 | .955 | 13.13 | 1.83 | 2.03 | 0 | 61 | Dry. |
| N-4 | 1.22 | .79 | 2.54 | 19.0 | 1.22 | 11.67 | 0 | 78 | Sticky. |
| N-5 | 1.36 | .648 | 2.09 | 18.37 | 1.36 | 10.2 | 0 | 78.8 | Sticky. |
| N-6 | 1.63 | .42 | 1.35 | 16.1 | 1.63 | 6.3 | 0 | 78 | Sticky. |
| N-7 | 1.85 | .209 | .775 | 14.72 | 1.85 | 3.62 | 0 | 78 | Sticky. |
| RU-1 | 2.16 | .434 | 1.04 | 6.0 | 1 | 0 | 1.16 | 0 | Dry. |
| RU-2 | 2.34 | .0958 | .23 | 6.64 | 1.11 | 0 | 1.23 | 0 | Dry. |
| RU-3 | 2.2 | .01916 | .046 | 10.365 | 1.73 | 0 | .47 | 0 | Dry. |
| RU-4 | 1.495 | .958 | 2.3 | 13.2 | 1.495 | 4.2 | 0 | 56.3 | Sticky. |
| RU-5 | 1.9 | .34 | .815 | 12.5 | 1.9 | 2.1 | 0 | 64.5 | Sticky. |
| D-1 | 2.34 | .161 | .322 | 6.16 | 1.03 | 0 | 1.31 | 0 | Sticky. |
| BW-1 | 2.36 | .248 | .396 | 5.04 | .84 | 0 | .52 | 0 | Sticky. |
| BW-2 | 2.19 | .0314 | .0502 | 10.57 | 1.76 | 0 | .43 | 0 | Sticky. |

*Sodium silicate N.*—In Examples N-1 and N-4, the anhydrous sodium tripolyphosphate and the selected sodium silicate liquid have been used without adding water, giving both dry and sticky duplex compositions. The same is true in Examples N-2, -3, -5, -6 and -7 wherein additional water has been used. In all of these cases using solution N there has been used an excess of total water over that needed to hydrate all of the anhydrous sodium tripolyphosphate, thereby assuring the production of a residual partially dewatered yet aqueous sodium silicate. In Examples N-1 and -2, each yielding a dry product, it has been calculated that if all the anhydrous sodium tripolyphosphate is hydrated, the residual sodium silicate solution corresponds to analysis as follows by weight:

$Na_2O$ _____ 16%.
$SiO_2$ _____ 50.3%.
$H_2O$ _____ 33.5% (63 molar percent).

In Example N-3, the residual sodium silicate solution calculates to 61 molar percent of water. However, it is by no means established that all of the anhydrous sodium tripolyphosphate is hydrated, and if it is not, it is certain that the range of 61 to 63 molar percent is the possible minimum content of water for it. Thus, the water content of the residual aqueous sodium silicate solution in the dry granular compositions is at least 61 molar percent.

Using the same sodium silicate solution N, both with and without adding water and in quantities to provide more total water than required by the anhydrous sodium tripolyphosphate, it has been ascertained that sticky compositions calculate to a theoretical content of 78 molar percent of water for the partially dehydrated silicate solution. In Examples N-4, -5, -6 and -7, the sticky compositions are indicated in column 9 of Table III as having 78 to 78.8 molar percent of water in the residual silicate solution, if all the anhydrous sodium tripolyphosphate is hydrated.

*Sodium silicate RU.*—By changing the ratio of $Na_2O$ to $SiO_2$ in the selected sodium silicate, the character of the product and the proportions to give respectively dry and sticky products are altered. In Examples RU-1, -2, and -3, insufficient total water was used to hydrate all the anhydrous sodium tripolyphosphate, and dry granular composition were produced. In Table III, column 8 indicates the moles of unhydrated original sodium tripolyphosphate remaining according to the theory. The theory indicates that anhydrous sodium silicate would remain. Because dry granular products (Examples N-1, -2 and -3) are possible with residual aqueous sodium silicate, it is likely that the dry granular products of Examples RU-1, -2 and -3 also contain residual aqueous sodium silicate solution.

In Example RU-4, no added water has been used, as was used in Example RU-5. Both examples employed in total water in excess of the capacity of the anhydrous sodium tripolyphosphate to use it, and both gave sticky compositions. Assuming the theoretical complete hydration of the sodium tripolyphosphate, these examples indicate that a partially dehydrated aqueous solution of sodium silicate having a ratio of $Na_2O$ to $SiO_2$ of 1 to 2.4 and a molar percent of water in the range from 56.3 to 64.5 (see column 9 of Table III) causes the composition to manifest stickiness. If the supposed competition for water exists, it would follow that the molar percent of water is greater than indicated.

Comparison of results with sodium silicate solutions N and RU indicates an increased tendency to stickiness as the ratio of $Na_2O$ to $SiO_2$ increases. This is confirmed by results with sodium silicate solutions D and BW.

*Sodium silicates D and BW.*—In Examples D-1 and BW-1 and -2 (see Tables II and III), insufficient total water was used to satisfy the capacity of the anhydrous sodium tripolyphosphate, as indicated in column 8 of Table III, where the theoretical residual content of anhydrous sodium tripolyphosphate is given. Yet the products were sticky. Table II shows that the proportion of the sodium silicate solution to anhydrous sodium tripolyphosphate is very low, making the products far from preferred.

From the foregoing studies, from a lack of knowledge of what actually occurs, and in view of the variability of the aqueous sodium silicate solution which may be employed, it is presently impossible to define the dry products in terms of its actual or range of compositions to distinguish from the sticky products. Yet it is possible readily to operate the process with sodium silicate solutions N and RU with and without added water to secure dry products (see Examples N-1, -2 and -3, and RU-1, -2 and -3.). The product is dry upwardly from no usage of a particular aqueous sodium silicate solution to an empirically determinable critical usage beyond which the homogeneous product is sticky. Thus, the amount of sodium silicate solution is less than that amount of it which is capable of giving a sticky product.

Accordingly, the invention is set forth in terms of both process and product in the appended claims.

I claim:

1. The method which comprises agitating a mass of particles of anhydrous sodium tripolyphosphate at a temperature below the critical temperature for initiation of decomposition of sodium tripolyphosphate hexahydrate in the presence of water, slowly adding to said agitated mass and thereby mixing therewith an aqueous solution of sodium silicate having a ratio of $Na_2O$ to $SiO_2$ in the range from the ratio of 1 to 2.40 to the ratio of 1 to 3.22, the amount of said solution being less than a maximum amount, and stopping the said addition and continuing the mixing until the mass is a homogeneous mass of dry particles, said maximum amount being the least amount for the particular formulation hereof which produces a sticky product at the end of one hour of said continued mixing.

2. The method which comprises agitating a mass of particles of anhydrous sodium tripolyphosphate at a temperature below the critical temperature for initiation of decomposition of sodium tripolyphosphate hexahydrate in the presence of water, slowly adding to said agitated mass and thereby mixing therewith an aqueous solution of sodium silicate having a ratio of $Na_2O$ to $SiO_2$ of 1 to 3.22, the amount of said solution being less than a maximum amount, and stopping the said addition and continuing the mixing until the mass is a homogeneous mass of dry particles, said maximum amount being the least amount for the particular formulation hereof which produces a sticky product at the end of one hour of said continued mixing.

3. The method which comprises agitating a mass of particles of anhydrous sodium tripolyphosphate at a temperature below the critical temperature for initiation of decomposition of sodium tripolyphosphate hexahydrate in the presence of water, slowly adding to said agitated mass and thereby mixing therewith an aqueous solution of sodium silicate having a ratio of $Na_2O$ to $SiO_2$ of 1 to 3.22, the amount of said solution being less than a maximum amount, the amount of water in said solution being in excess of 6 moles of water per mole of said anhydrous sodium tripolyphosphate, and stopping the said addition and continuing the mixing until the mass is a homogeneous mass of dry particles, said maximum amount being the least amount for the particular formulation hereof which produces a sticky product at the end of one hour of said continued mixing.

4. The method which comprises agitating a mass of particles of anhydrous sodium tripolyphosphate at a temperature below 60° C., slowly adding to said agitated mass and thereby mixing therewith an aqeous solution of sodium silicate having a ratio of $Na_2O$ to $SiO_2$ of 1 to 2.40, the amount of said solution being less than a maximum amount, the amount of water in said solution being less than an amount corresponding to 6 moles of water per mole of said anhydrous sodium tripolyphosphate, and stopping the said addition and continuing the mixing until the mass is a homogeneous mass of dry particles, said maximum amount being the least amount for the particular formulation hereof which produces a sticky product at the end of one hour of said continued mixing.

5. The product of the process of claim 1.

References Cited in the file of this patent
UNITED STATES PATENTS

| | | |
|---|---|---|
| 2,204,357 | Heckert | June 11, 1940 |
| 2,333,443 | Robinson | Nov. 2, 1943 |
| 2,333,444 | Robinson | Nov. 2, 1943 |
| 2,712,529 | Mills | July 5, 1955 |